United States Patent
Yamada

(10) Patent No.: US 10,691,297 B2
(45) Date of Patent: Jun. 23, 2020

(54) DISPLAY CONTROL DEVICE

(71) Applicant: KYOCERA Document Solutions Inc., Osaka (JP)

(72) Inventor: Sumio Yamada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/282,248

(22) Filed: Feb. 21, 2019

(65) Prior Publication Data

US 2019/0265861 A1 Aug. 29, 2019

(30) Foreign Application Priority Data

Feb. 23, 2018 (JP) .................. 2018-030591

(51) Int. Cl.
   *G06F 3/048*    (2013.01)
   *G06F 3/0481*   (2013.01)
   *G09G 5/14*     (2006.01)
   *G09G 5/373*    (2006.01)
   *G06F 3/0488*   (2013.01)

(52) U.S. Cl.
   CPC ...... *G06F 3/04817* (2013.01); *G06F 3/04886* (2013.01); *G09G 5/14* (2013.01); *G09G 5/373* (2013.01); *G09G 2340/045* (2013.01); *G09G 2340/0492* (2013.01); *G09G 2354/00* (2013.01)

(58) Field of Classification Search
   CPC .................................................. G06F 3/04817
   USPC ........................................................... 715/750
   See application file for complete search history.

(56) References Cited

U.S. PATENT DOCUMENTS

| 8,947,439 B2* | 2/2015 | Benayon ............... G06Q 10/06 345/473 |
| 2014/0337755 A1* | 11/2014 | Pearce .................. G06F 3/0488 715/750 |
| 2015/0058762 A1 | 2/2015 | Sato |
| 2016/0349960 A1* | 12/2016 | Kumar ................ G06F 3/04817 |
| 2017/0004007 A1* | 1/2017 | Kousaka ................... G06F 8/36 |
| 2017/0253181 A1* | 9/2017 | Choi ........................ B60Q 9/008 |
| 2019/0294587 A1* | 9/2019 | Prakash ................ G06F 3/0482 |
| 2019/0387095 A1* | 12/2019 | Lyren ..................... H04S 7/302 |

FOREIGN PATENT DOCUMENTS

JP   2015-041336 A   3/2015

\* cited by examiner

*Primary Examiner* — William D Titcomb
(74) *Attorney, Agent, or Firm* — Studebaker & Brackett PC

(57) ABSTRACT

A tablet terminal includes a touch panel and a controller. The controller includes a first display section, a determination section, a second display section, and an adjustment section. The first display section displays a first icon associated with a first file on the touch panel. The determination section determines whether or not a specific operation has been performed with respect to the first icon. The second display section displays a second icon associated with the first file on the touch panel upon the determination section determining that the specific operation has been performed with respect to the first icon. The adjustment section adjusts an orientation and a size of the second icon.

9 Claims, 13 Drawing Sheets

TBL1

| Reference sign | Orientation DJ | File name associated with second icon JC2 | Editable /non-editable |
|---|---|---|---|
| JC2A | 90° | Test.txt | Editable |
| JC2B | 180° | Test.txt | Editable |
| JC2C | 270° | Test.txt | Non-editable |

TBL2

| Reference sign | Orientation DJ | File name associated with second icon JC2 | Editable /non-editable |
|---|---|---|---|
| JC2A | 90° | Test_001.txt | Editable |
| JC2B | 180° | Test_002.txt | Editable |
| JC2C | 270° | Test.txt | Non-editable |

TBL3

| Reference sign | Orientation DJ | File name associated with second icon JC2 | Editable /non-editable |
|---|---|---|---|
| JC2A | 90° | Test.txt | Editable |
| JC2B | 180° | Test.txt | Editable |
| JC2C | 270° | Test.txt | Non-editable |

FIG. 8

DISPLAY CONTROL DEVICE

INCORPORATION BY REFERENCE

The present application claims priority under 35 U.S.C. § 119 to Japanese Patent Application No. 2018-030591, filed on Feb. 23, 2018. The contents of this application are incorporated herein by reference in their entirety.

BACKGROUND

The present disclosure relates to a display control device.

Some display control devices include a display and a controller. The controller copies an icon and positions the icon on the display by rotating the icon in a specific direction in accordance with an operation by a user. The controller then opens a window such that the window is displayed in the same orientation as the icon and opens a file in accordance with a long press operation on the icon by the user.

SUMMARY

A display control device according to an aspect of the present disclosure includes a display, a first display section, a determination section, a second display section, and an adjustment section. The first display section displays a first icon associated with a first file on the display. The determination section determines whether or not a specific operation has been performed with respect to the first icon. The second display section displays a second icon associated with the first file on the display upon the determination section determining that the specific operation has been performed with respect to the first icon. The adjustment section adjusts an orientation and a size of the second icon.

BRIEF DESCRIPTION OF THE DRAWINGS

FIG. 8 is a diagram illustrating an example of a relationship between second icons and file names.

DETAILED DESCRIPTION

Figure 1:
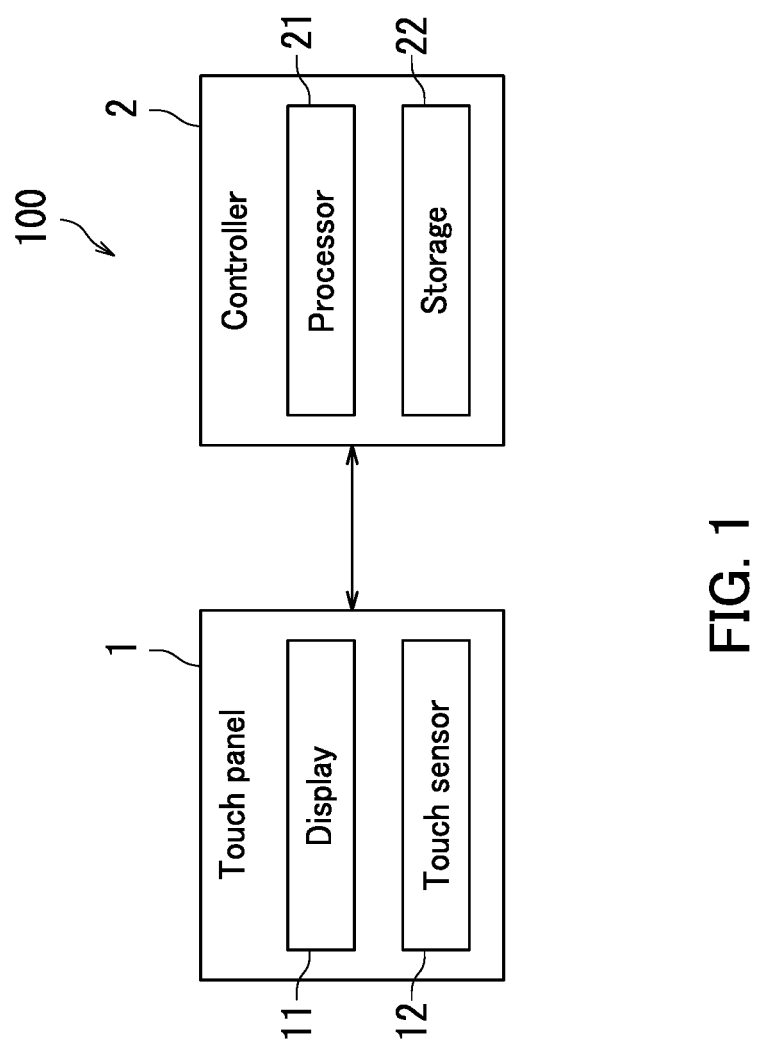
FIG. 1 is a diagram illustrating an example of a configuration of a tablet terminal according to an embodiment of the present disclosure.

The following describes an embodiment of the present disclosure with reference to the accompanying drawings (FIGS. 1 to 13). Elements in the drawings that are the same or equivalent are marked by the same reference signs and description thereof will not be repeated.

First, a configuration of a tablet terminal 100 according to the embodiment of the present disclosure will be described with reference to FIG. 1. FIG. 1 illustrates an example of the configuration of the tablet terminal 100. As illustrated in FIG. 1, the tablet terminal 100 includes a touch panel 1 and a controller 2. The touch panel 1 displays an image and receives an operation from a user. The controller 2 controls operation of the touch panel 1. The tablet terminal 100 is equivalent to an example of what may be referred to as "a display control device".

The touch panel 1 includes a display 11 and a touch sensor 12. The display 11 for example includes a liquid crystal display (LCD) and displays various images. The touch sensor 12 receives an operation from a user. The touch sensor 12 is for example disposed over a display surface of the display 11. The touch panel 1 has a rectangular shape.

The controller 2 includes a processor 21 and storage 22. The processor 21 for example includes a central processing unit (CPU). The storage 22 includes memory such as semiconductor memory and optionally includes a hard disk drive (HDD). The storage 22 stores therein a control program.

Figure 2:
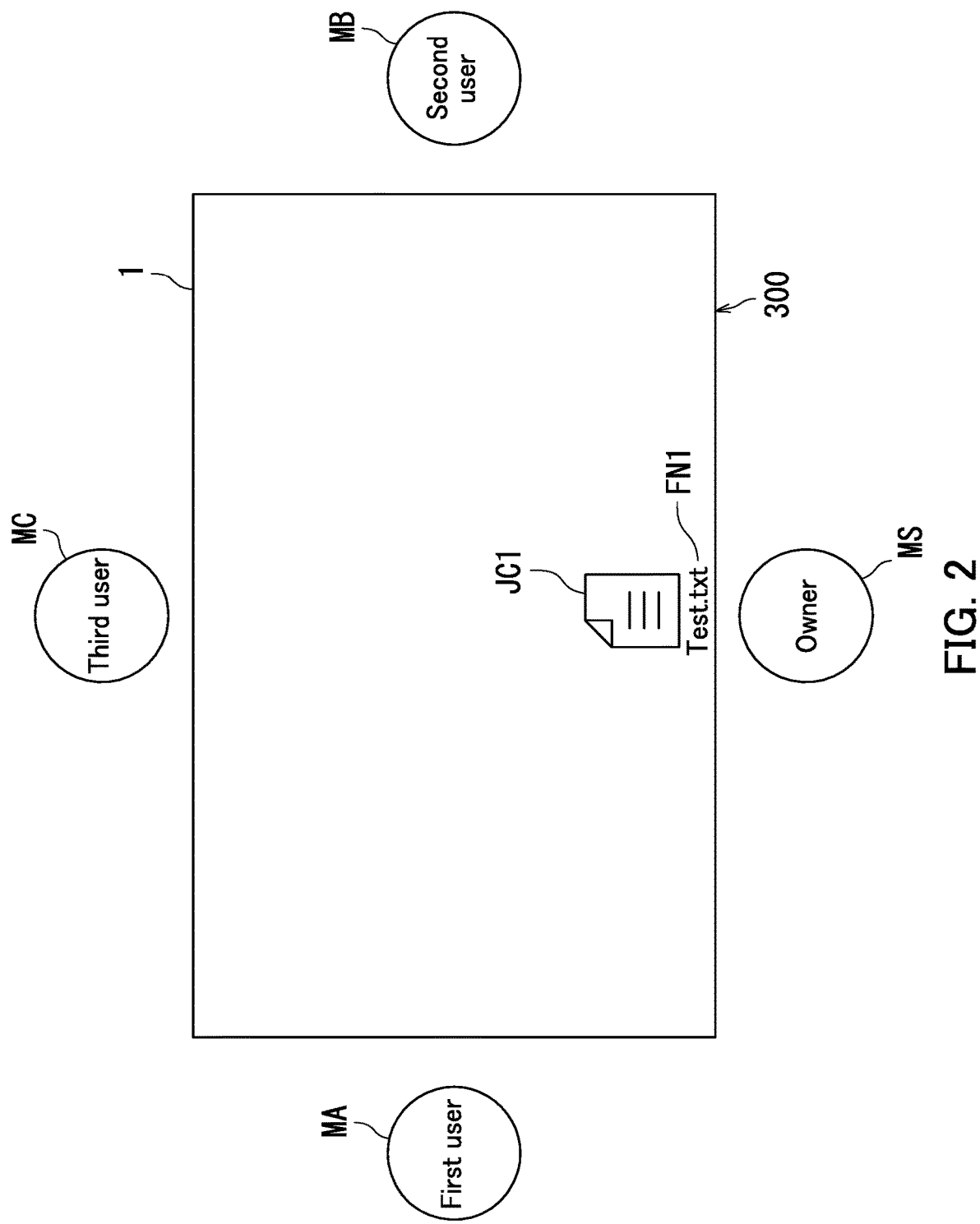
FIG. 2 is a screen diagram illustrating an example of a first screen that is displayed on a touch panel.

The following describes a first screen 300 that is displayed on the touch panel 1 with reference to FIGS. 1 and 2. FIG. 2 is a screen diagram illustrating an example of the first screen 300 that is displayed on the touch panel 1. As illustrated in FIG. 2, a first icon JC1 is displayed on the first screen 300.

The first icon JC1 is associated with a first file F1. The first icon JC1 includes a file name display section FN1. A file name of the first file F1 is displayed in the file name display section FN1. For example, the file name of the first file F1 is "Test.txt".

According to the embodiment of the present disclosure, the touch panel 1 is operated by four users. Specifically, the four users include an owner MS, a first user MA, a second user MB, and a third user MC. The four users are located around the touch panel 1. Each of the four users faces a different peripheral edge of the touch panel 1.

The owner MS means a user who operates the first icon JC1. The first user MA is located to the left of the owner MS. The second user MB is located to the right of the owner MS. The third user MC is located across from the owner MS. The owner MS is for example an owner of the tablet terminal 100. The owner MS may for example be a leader of a project.

Figure 3:
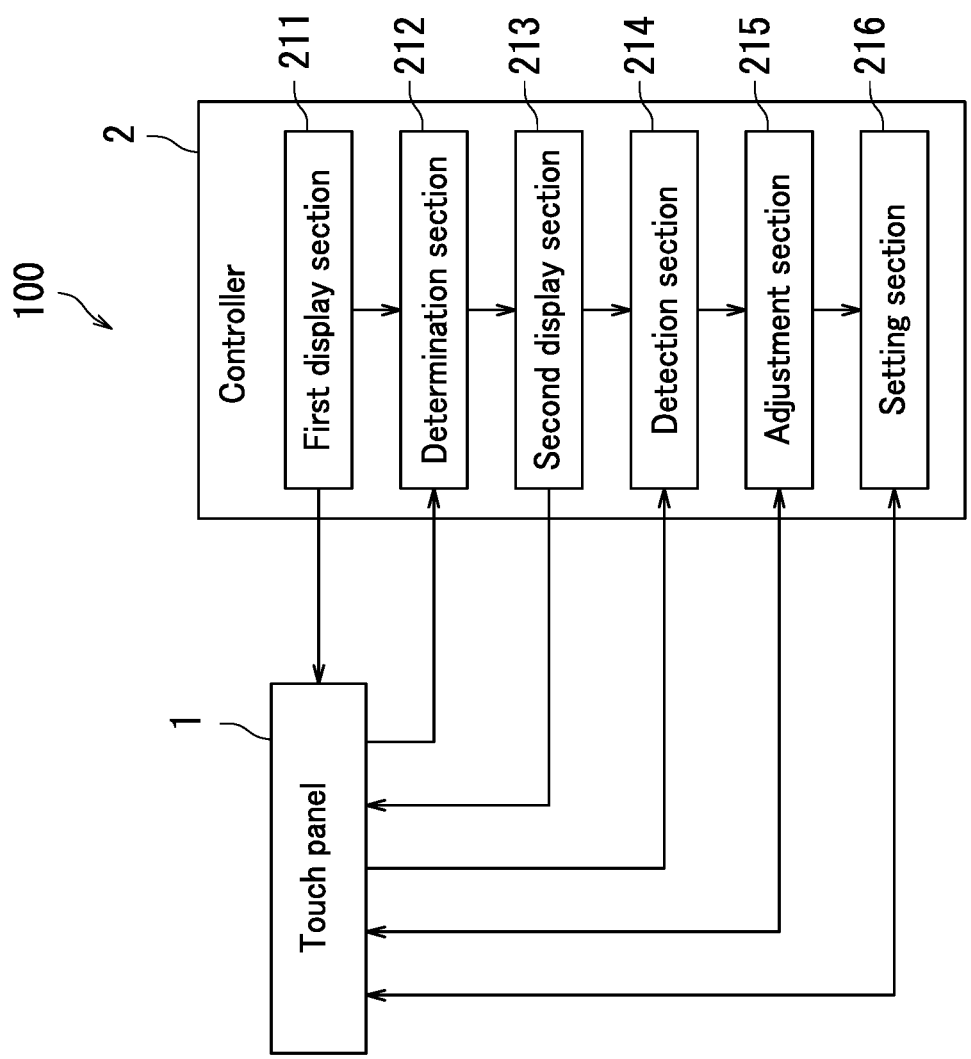
FIG. 3 is a diagram illustrating an example of a configuration of a controller according to the embodiment of the present disclosure.

The following describes a configuration of the controller 2 according to the embodiment of the present disclosure with reference to FIGS. 1 to 3. FIG. 3 is a diagram illustrating an example of the configuration of the controller 2. The controller 2 includes a first display section 211, a determination section 212, a second display section 213, a detection section 214, an adjustment section 215, and a setting section 216. Specifically, the processor 21 of the controller 2 functions as the first display section 211, the determination section 212, the second display section 213, the detection section 214, the adjustment section 215, and the setting section 216 by executing the control program. The configuration of the controller 2 will be further described later with reference to FIG. 7.

The first display section 211 displays the first icon JC1 on the touch panel 1. The first icon JC1 is associated with the first file F1. Specifically, the first display section 211 displays the first screen 300 described with reference to FIG. 2 on the touch panel 1.

The determination section 212 determines whether or not a long press operation LT has been performed on the first icon JC1. Specifically, the determination section 212 determines whether or not the long press operation LT has been performed on the first icon JC1 by detecting the long press operation LT through the touch sensor 12. The long press operation LT is equivalent to part of what may be referred to as "a specific operation". The long press operation LT means a touch operation that continues for a specific period of time or longer. The specific period of time is for example two seconds.

The second display section 213 displays a second icon JC2 associated with the first file F1 on the touch panel 1 on a condition that the determination section 212 determines that the long press operation LT has been performed on the first icon JCL The second display section 213 will be described in detail later with reference to FIGS. 4 and 5.

The detection section 214 detects an orientation DR of a fingerprint of a user. Specifically, the detection section 214 detects the orientation DR indicated by a tip of the fingerprint.

The adjustment section 215 adjusts an orientation DJ and a size SJ of the second icon JC2. The adjustment section 215 adjusts the orientation DJ of the second icon JC2 based on a result of the detection by the detection section 214. Specifically, the adjustment section 215 adjusts the orientation DJ of the second icon JC2 so that the orientation DJ of the second icon JC2 matches the orientation DR indicated by the tip of the fingerprint.

The adjustment section 215 adjusts the size SJ of the second icon JC2 in accordance with an operation by a user. For example, upon a pinch-in operation being performed on the second icon JC2, the adjustment section 215 reduces the size SJ of the second icon JC2. Upon a pinch-out operation being performed on the second icon JC2, the adjustment section 215 enlarges the size SJ of the second icon JC2. The adjustment section 215 will be described in detail later with reference to FIGS. 4 to 6.

The setting section 216 decides an opening limitation for opening of the first file F1 using the second icon JC2. The opening limitation indicates a maximum value NF of the number of files permitted to be opened depending on a size SZ of the touch panel 1.

According to the embodiment of the present disclosure, as described above with reference to FIGS. 1 to 3, the adjustment section 215 adjusts the orientation DJ and the size SJ of the second icon JC2. Through the above, the second icon JC2 can be adjusted to an orientation DJ and a size SJ desired by a user. Thus, the device can provide further improved user-friendliness.

The detection section 214 detects the orientation DR of a fingerprint of a user, and the adjustment section 215 adjusts the orientation DJ of the second icon JC2 based on the result of the detection. It is therefore possible to readily adjust the orientation DJ of the second icon JC2. Thus, the device can provide improved user-friendliness.

The setting section 216 decides the maximum value NF of the number of files permitted to be opened depending on the size SZ of the touch panel 1. It is therefore possible to prevent file editing from being difficult due to a shortage of space for displaying windows. Thus, the device can provide further improved user-friendliness.

According to the embodiment of the present disclosure, the adjustment section 215 adjusts the orientation DJ of the second icon JC2 based on the result of the detection by the detection section 214. However, the present disclosure is not limited as such, so long as the adjustment section 215 adjusts the orientation DJ of the second icon JC2. For example, the adjustment section 215 may adjust the orientation DJ of the second icon JC2 in accordance with an operation on the touch panel 1 by a user.

According to the embodiment of the present disclosure, the detection section 214 detects the orientation DR of a fingerprint of a user. However, the present disclosure is not limited as such, so long as the detection section 214 detects the orientation of the user. For example, the detection section 214 may detect a gaze direction of the user.

Figure 4:
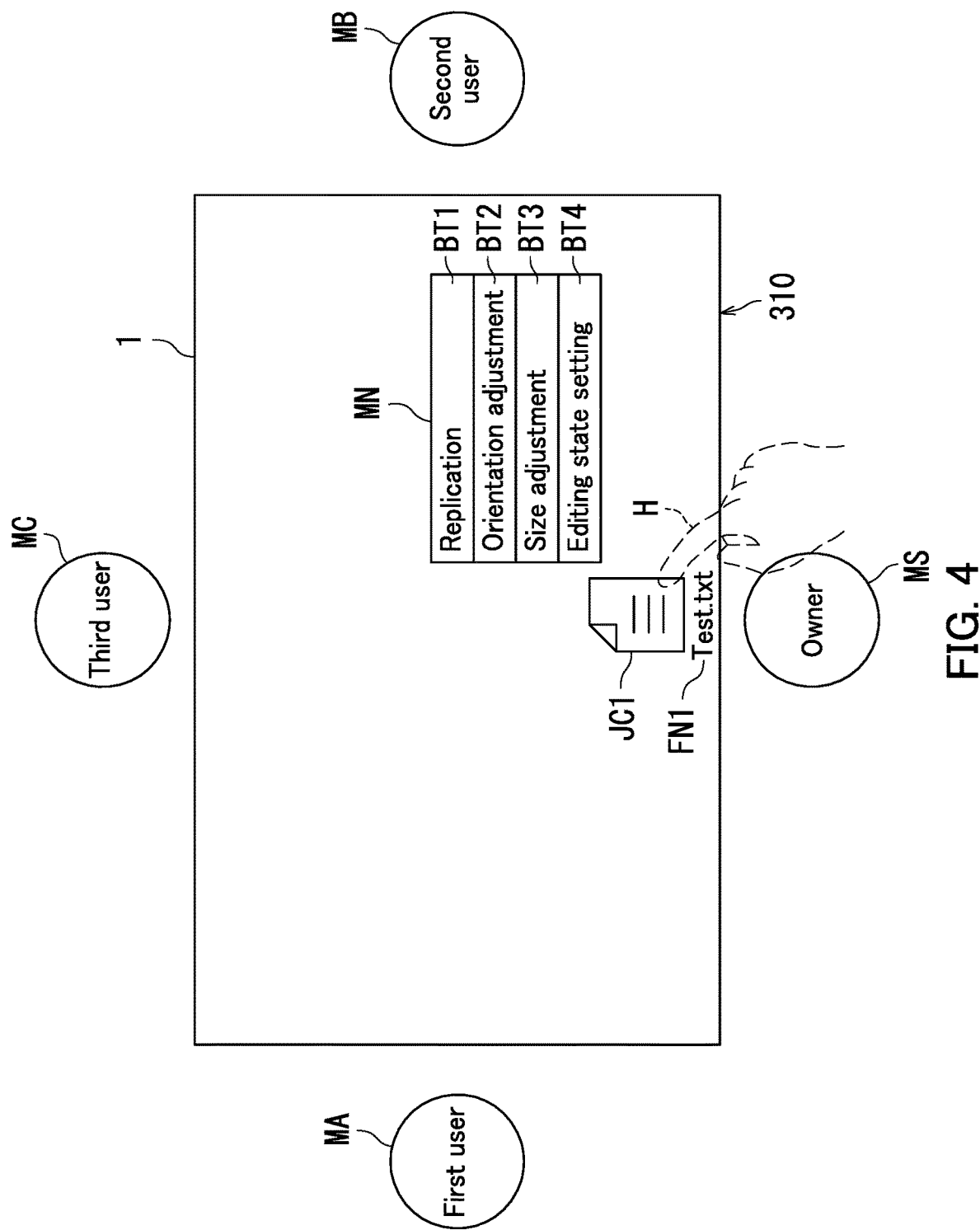
FIG. 4 is a screen diagram illustrating an example of a menu screen that is displayed on the touch panel.

The following further describes a process that is performed by the controller 2 with reference to FIGS. 3 and 4. FIG. 4 is a screen diagram illustrating an example of a menu screen 310 that is displayed on the touch panel 1. As illustrated in FIG. 4, the first icon JC1 and a menu display section MN are displayed on the menu screen 310. The controller 2 displays the menu screen 310 on the touch panel 1 upon the determination section 212 determining that the long press operation LT has been performed on the first icon JC1.

The menu display section MN includes a replication button BT1, an orientation adjustment button BT2, a size adjustment button BT3, and an editing state setting button BT4.

A user performs a touch operation on the replication button BT1 for displaying the second icon JC2 on the touch panel 1. Upon the user performing the touch operation on the replication button BT1, the second display section 213 displays a second screen 320 on the touch panel 1. The touch operation on the replication button BT1 by the user is equivalent to part of the "specific operation". That is, according to the present embodiment, the "specific operation" includes the long press operation LT on the first icon JC1 and the touch operation on the replication button BT1. The second screen 320 includes the second icon JC2. The second screen 320 will be described later with reference to FIG. 5.

The user touches the orientation adjustment button BT2 to adjust the orientation DJ of the second icon JC2. Upon the user touching the orientation adjustment button BT2, the detection section 214 detects the orientation DR indicated by the tip of the fingerprint of the user. The adjustment section 215 then adjusts the orientation DJ of the second icon JC2 so that the orientation DJ of the second icon JC2 matches the orientation DR indicated by the tip of the fingerprint.

The user performs a touch operation on the size adjustment button BT3 to adjust the size SJ of the second icon JC2. Upon the user performing the touch operation on the size adjustment button BT3, the adjustment section 215 receives an operation on the second icon JC2 from the user. For example, the adjustment section 215 receives a pinch-in operation on the second icon JC2. In response, the adjustment section 215 reduces the size SJ of the second icon JC2. For another example, the adjustment section 215 receives a pinch-out operation on the second icon JC2. In response, the adjustment section 215 enlarges the size SJ of the second icon JC2.

The user performs a touch operation on the editing state setting button BT4 to decide whether to open the first file F1 as editable or non-editable using the second icon JC2. Upon the user performing the touch operation on the editing state setting button BT4, the setting section 216 receives an operation from the user. For example, the setting section 216 displays an enabling button indicating an "editable" state and a disabling button indicating a "non-editable" state on the touch panel 1. Upon the user performing a touch operation on the enabling button, the setting section 216 decides to open the first file F1 as editable using the second icon JC2. Upon the user performing a touch operation on the disabling button, the setting section 216 decides to open the first file F1 as non-editable using the second icon JC2.

As described above with reference to FIGS. 3 and 4, the setting section 216 decides whether the first file F1 is to be editable or non-editable when the first file F1 is opened using the second icon JC2. Accordingly, editing of the first file F1 can be restricted. Thus, the device can provide further improved user-friendliness.

Figure 5:
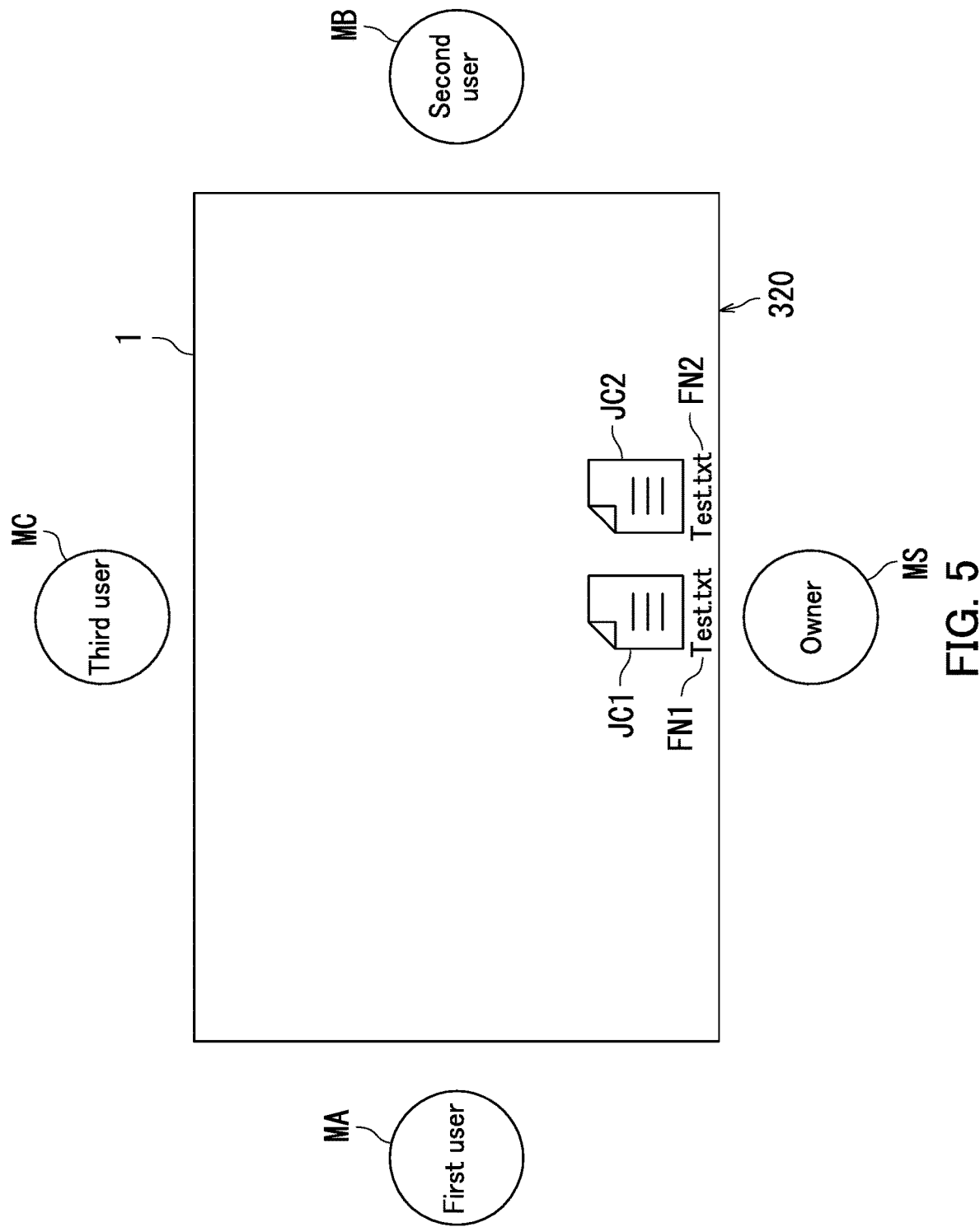
FIG. 5 is a screen diagram illustrating an example of a second screen that is displayed on the touch panel.

The following further describes the process that is performed by the controller 2 with reference to FIGS. 3 to 5. FIG. 5 is a screen diagram illustrating an example of the second screen 320 that is displayed on the touch panel 1. Upon the user performing a touch operation on the replication button BT1 illustrated in FIG. 4, the second display section 213 displays the second screen 320 on the touch panel 1.

As illustrated in FIG. 5, the first icon JC1 and the second icon JC2 are displayed on the second screen 320. The second icon JC2 is displayed in the same orientation as the first icon JC1 and in the same size SJ as the first icon JC1. That is, the second display section 213 displays the second screen 320 on the touch panel 1 before touch operations are performed on the orientation adjustment button BT2 and the size adjustment button BT3 illustrated in FIG. 4.

Figure 6:
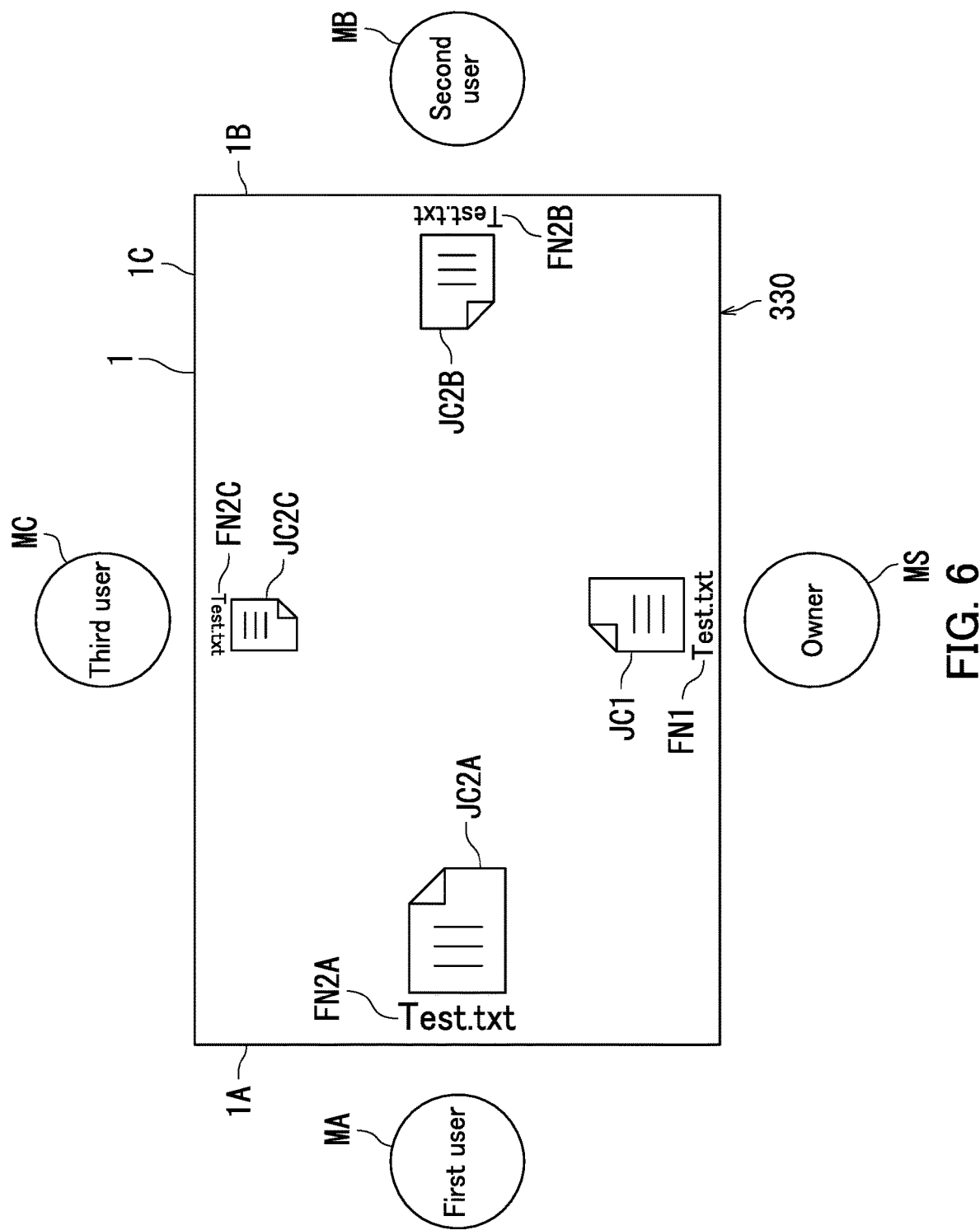
FIG. 6 is a screen diagram illustrating an example of a third screen that is displayed on the touch panel.

The following further describes the process that is performed by the controller 2 with reference to FIGS. 3 to 6. FIG. 6 is a screen diagram illustrating an example of a third screen 330 that is displayed on the touch panel 1. The second display section 213 displays the third screen 330 on the touch panel 1.

As illustrated in FIG. 6, the first icon JC1, a second icon JC2A, a second icon JC2B, and a second icon JC2C are displayed on the third screen 330. The second icon JC2A, the second icon JC2B, and the second icon JC2C are each equivalent to an example of the second icon JC2.

The second icon JC2A is the second icon JC2 illustrated in FIG. 5 that has been rotated 90 degrees clockwise and enlarged to 150% by the adjustment section 215. The adjustment section 215 positions the second icon JC2A as an icon for the first user MA. Specifically, the adjustment section 215 positions the second icon JC2A along a short edge 1A. The short edge 1A is a short edge adjacent to the first user MA among the peripheral edges of the touch panel 1.

The second icon JC2B is the second icon JC2 illustrated in FIG. 5 that has been rotated 270 degrees clockwise by the adjustment section 215. The adjustment section 215 positions the second icon JC2B as an icon for the second user MB. Specifically, the adjustment section 215 positions the second icon JC2B along a short edge 1B. The short edge 1B is a short edge adjacent to the second user MB among the peripheral edges of the touch panel 1.

The second icon JC2C is the second icon JC2 illustrated in FIG. 5 that has been rotated clockwise by 180 degrees by the adjustment section 215 and that has been reduced to 60% by the adjustment section 215. The adjustment section 215 positions the second icon JC2C as an icon for the third user MC. Specifically, the adjustment section 215 positions the second icon JC2C along a long edge 1C. The long edge 1C is a long edge adjacent to the third user MC among the peripheral edges of the touch panel 1.

Upon adjusting the orientation DJ of the second icon JC2, the adjustment section 215 decides a position of the second icon JC2 to be displayed on the touch panel 1 depending on the orientation DJ of the second icon JC2. For example, upon rotating the orientation DJ of the second icon JC2 clockwise by 90 degrees, the adjustment section 215 displays the second icon JC2 along the short edge 1A. For another example, upon rotating the orientation DJ of the second icon JC2 clockwise by 180 degrees, the adjustment section 215 displays the second icon JC2 along the long edge 1C. For another example, upon rotating the orientation DJ of the second icon JC2 clockwise by 270 degrees, the adjustment section 215 displays the second icon JC2 along the short edge 1B.

According to the embodiment of the present disclosure, upon the orientation DJ of the second icon JC2 being adjusted, the position of the second icon JC2 to be displayed is decided depending on the orientation DJ of the second icon JC2 as described above with reference to FIGS. 3 to 6. Therefore, the users do not need to decide the positions of the respective second icons JC2 to be displayed. Thus, the device can provide further improved user-friendliness.

According to the present embodiment, the adjustment section 215 decides the position of the second icon JC2 to be displayed depending on the orientation DJ of the second icon JC2. However, the present disclosure is not limited as such, so long as the adjustment section 215 decides the position of the second icon JC2 to be displayed. For example, the adjustment section 215 may decide the position of the second icon JC2 to be displayed in accordance with an operation on the touch panel 1 by a user. The operation on the touch panel 1 by the user is for example a drag-and-drop operation on the second icon JC2.

According to the present embodiment, the second icon JC2 has the same image as the first icon JC1. However, the present disclosure is not limited as such. The second icon JC2 may include an image indicating a user who uses the second icon JC2. For example, the second icon JC2A illustrated in FIG. 6 may include an image indicating the first user MA. The second icon JC2B may include an image indicating the second user MB. The second icon JC2C may include an image indicating the third user MC. The image indicating the first user MA may for example be an image that exhibits the name of the first user MA or a symbol that represents an aspect of the first user MA.

The second icon JC2 including an image indicating a user who uses the second icon JC2 allows the user to easily recognize the second icon JC2 to use. Thus, the device can provide further improved user-friendliness.

Figure 7:
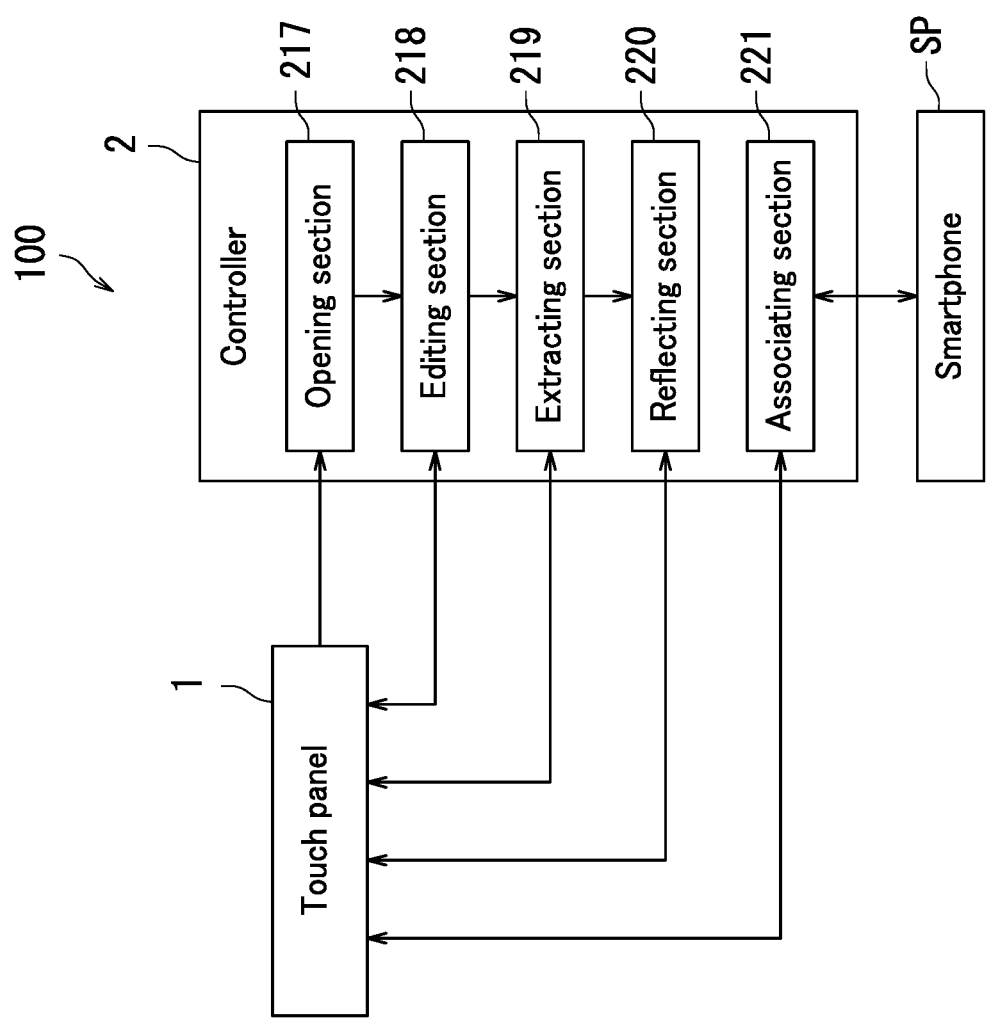
FIG. 7 is a diagram illustrating an example of the configuration of the controller according to the embodiment of the present disclosure.

Next, the configuration of the controller 2 according to the embodiment of the present disclosure will be further described with reference to FIGS. 3 to 7. FIG. 7 is a diagram illustrating an example of the configuration of the controller 2. As illustrated in FIG. 7, the controller 2 further includes an opening section 217, an editing section 218, an extracting section 219, a reflecting section 220, and an associating section 221. Specifically, the processor 21 of the controller 2 further functions as the opening section 217, the editing section 218, the extracting section 219, the reflecting section 220, and the associating section 221 by executing the control program.

The opening section 217 opens the first file F1 using the second icon JC2 in accordance with an operation by a user. Specifically, in response to a user performing a touch operation on the second icon JC2, the opening section 217 opens the first file F1, displays a window on the touch panel 1, and displays the content of the first file F1 in the window.

When the first file F1 is opened using the second icon JC2 and edited, the editing section 218 gives the edited first file F1 a specific file name FN2 and stores the file given the specific file name FN2 in the storage 22. The specific file name FN2 differs from the file name of the first file F1 and indicates that the file given the specific file name FN2 is related to the first file F1. In a case where the file name of the first file F1 is "Test.txt", the specific file name FN2 is for example "Test_001.txt" or "Test_002.txt".

The extracting section 219 extracts a difference between the content of a second file F2 and the content of the first file F1. The extracting section 219 extracts the difference out of the second file F2. The second file F2 means a file associated with the second icon JC2 and given the specific file name FN2.

The reflecting section 220 reflects the difference between the content of the second file F2 and the content of the first file F1 extracted by the extracting section 219 in the content of the first file F1.

The associating section 221 associates a plurality of input devices with orientations DJ of a plurality of second icons JC2. The touch panel 1 is communicatively connected to the input devices. The associating section 221 will be described in detail later with reference to FIG. 13. According to the present embodiment, the input devices are smartphones SP.

The following further describes the process that is performed by the controller 2 with reference to FIGS. 3 to 8. FIG. 8 is a diagram illustrating an example of a relationship between a plurality of second icons JC2 and a plurality of file names associated with the second icons JC2. FIG. 8 shows three tables. An upper table TBL1 represents a state in which the three second icons JC2 (the second icon JC2A, the second icon JC2B, and the second icon JC2C) are displayed as described with reference to FIG. 6. A middle table TBL2 represents a state in which editing of the first file F1 is complete. A lower table TBL3 represents a state in which a "consolidation process" is complete. The "consolidation process" means a process of reflecting the editing result in the first file F1. The "consolidation process" will be described in detail later with reference to FIG. 11.

As illustrated in FIG. 8, the tables TBL1 to TBL3 each contain reference signs of the three second icons JC2, the orientations DJ of the second icons JC2, file names associated with the second icons JC2, and editable/non-editable states.

As shown in the table TBL1, when the three second icons JC2 are displayed, the orientation DJ of the second icon JC2A is 90 degrees, the file name associated with the second icon JC2A is "Test.txt", and the editing state is editable. The orientation DJ of the second icon JC2B is 180 degrees, the file name associated with the second icon JC2B is "Test.txt", and the editing state is editable. The orientation DJ of the second icon JC2C is 270 degrees, the file name associated with the second icon JC2C is "Test.txt", and the editing state is editable. That is, the first file F1 is associated with the second icon JC2A, the second icon JC2B, and the second icon JC2C.

As shown in the table TBL2, when editing of the first file F1 is complete, the editing section 218 changes the file name associated with the second icon JC2A from "Test.txt" to "Test_001.txt". That is, the editing section 218 changes the file associated with the second icon JC2A from the first file F1 whose file name is "Test.txt" to the second file F2 whose file name is "Test_001.txt".

The editing section 218 changes the file name associated with the second icon JC2B from "Test.txt" to "Test_002.txt". That is, the editing section 218 changes the file associated with the second icon JC2B from the first file F1 whose file name is "Test.txt" to the second file F2 whose file name is "Test_002.txt".

Since the file associated with the second icon JC2C is non-editable, the file name associated with the second icon JC2C is not changed.

Once the "consolidation process" is complete, the controller 2 changes the file name associated with the second icon JC2A from "Test_001.txt" to "Test.txt" as shown in the table TBL3. That is, the controller 2 changes the file associated with the second icon JC2A from the second file F2 whose name is "Test_001.txt" to the first file F1 whose name is "Test.txt".

The controller 2 changes the file name associated with the second icon JC2B from "Test_002.txt" to "Test.txt". That is, the controller 2 changes the file associated with the second icon JC2B from the second file F2 whose name is "Test_002.txt" to the first file F1 whose name is "Test.txt".

The file name associated with the second icon JC2C is not changed.

According to the embodiment of the present disclosure, as described above with reference to FIGS. 3 to 8, the editing section 218 gives the edited first file F1 the specific file name FN2 and stores the file given the specific file name FN2 when the first file F1 is opened using the second icon JC2 and edited. The specific file name FN2 differs from the file name of the first file F1 and indicates that the file given the specific file name FN2 is related to the first file F1. The specific file name FN2 is the file name of the second file F2. Each user can therefore recognize the edited first file F1 based on the specific file name FN2. Thus, the device can provide further improved user-friendliness.

Figure 9:
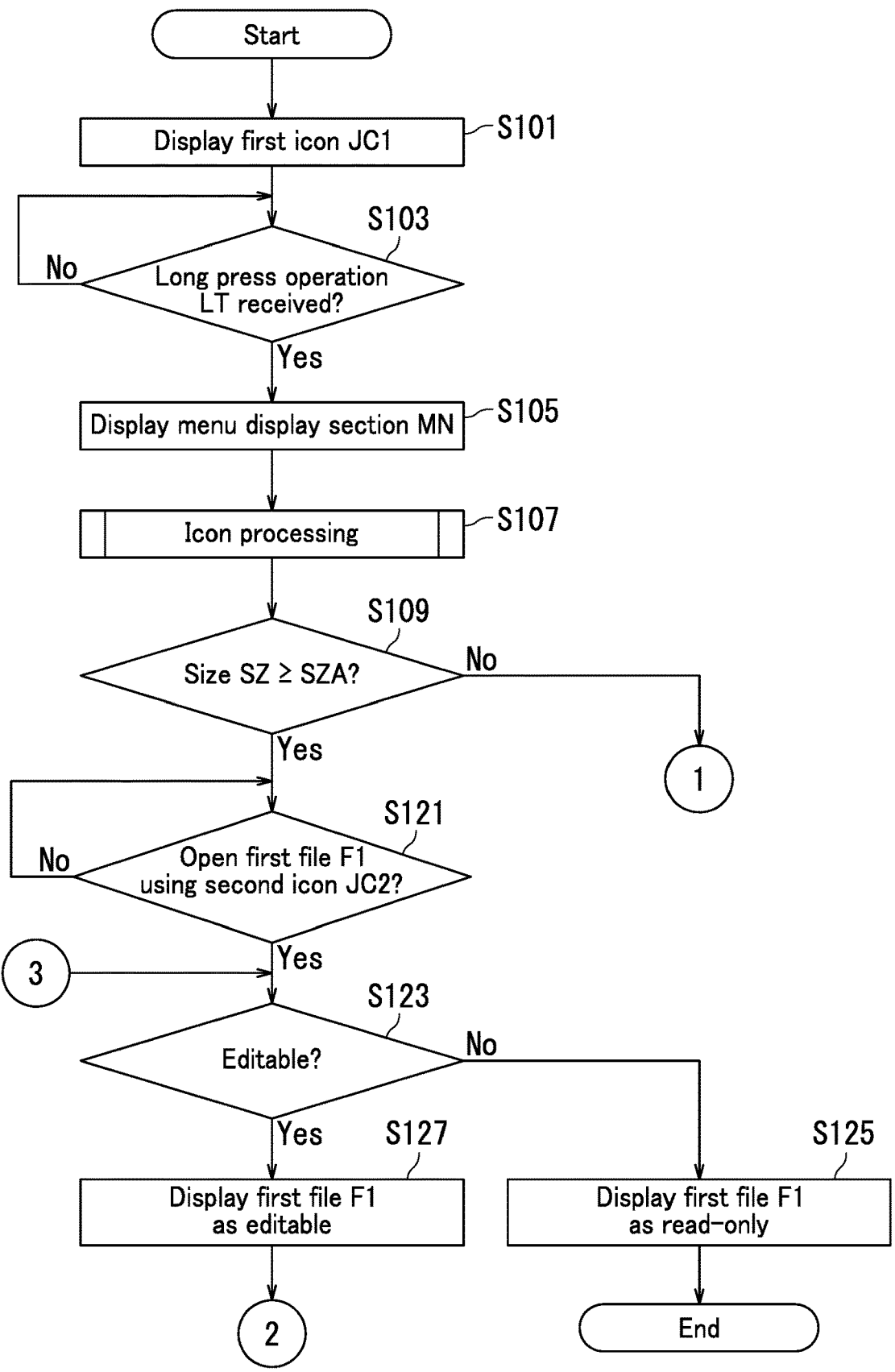
FIG. 9 is a flowchart illustrating an example of a process that is performed by the controller.
Figure 10:
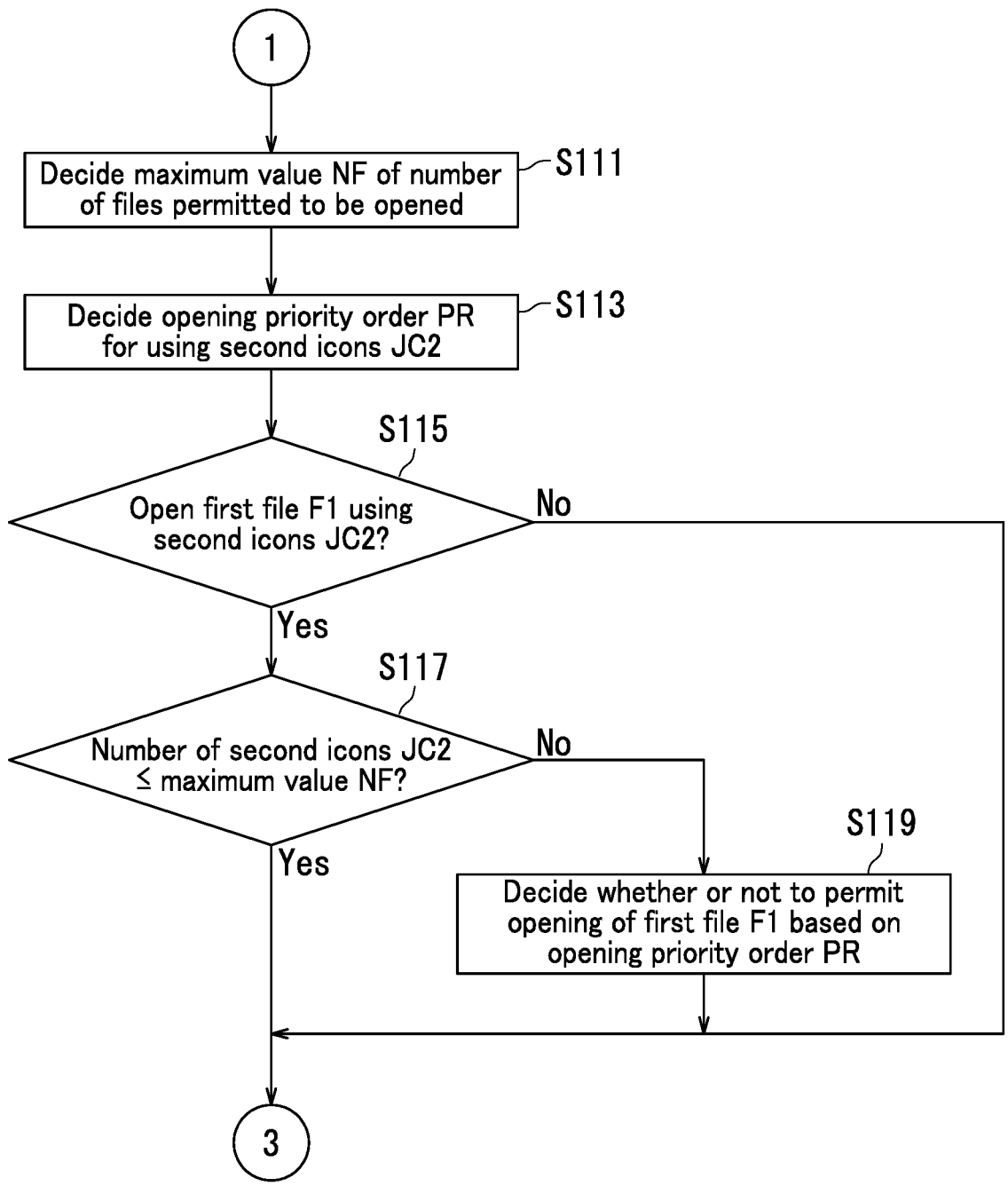
FIG. 10 is a flowchart illustrating an example of the process that is performed by the controller.
Figure 11:
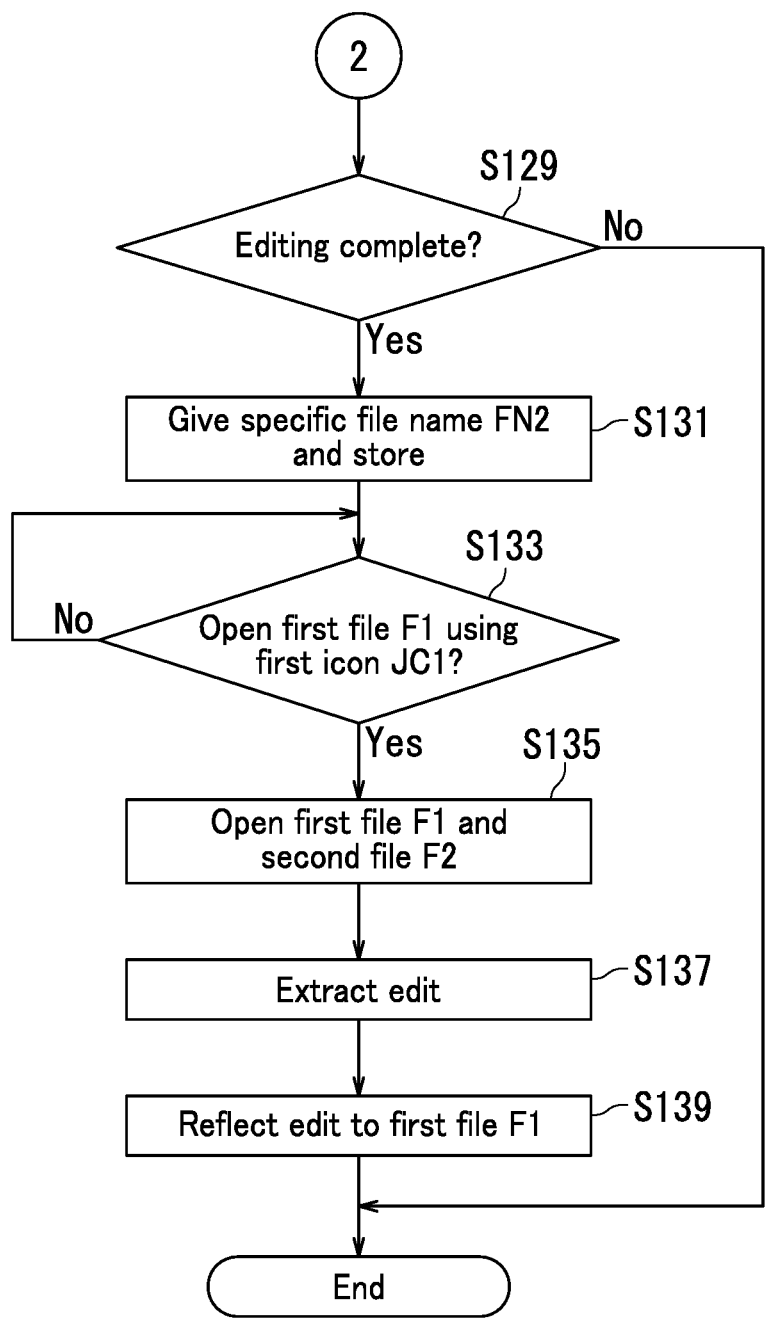
FIG. 11 is a flowchart illustrating an example of the process that is performed by the controller.

The following describes the process that is performed by the controller 2 with reference to FIGS. 3 to 11. FIGS. 9 to 11 are flowcharts illustrating operation of the controller 2.

First, in Step S101 in FIG. 9, the first display section 211 displays the first icon JC1 on the touch panel 1.

Next, in Step S103, the determination section 212 determines whether or not the long press operation LT has been performed on the first icon JC1.

Upon the determination section 212 determining that the long press operation LT has not been performed (No in Step S103), the process enters a standby state. Upon the determination section 212 determining that the long press operation LT has been performed (Yes in Step S103), the process proceeds to Step S105.

In Step S105, the controller 2 displays the menu display section MN illustrated in FIG. 4 on the touch panel 1.

Next, in Step S107, the controller 2 performs "icon processing". The "icon processing" means a process of deciding the orientation DJ of the second icon JC2, the size SJ of the second icon JC2, and whether the file (the first file F1) associated with the second icon JC2 is to be editable or non-editable. The "icon processing" will be described in detail later with reference to FIG. 12.

Next, in Step S109, the controller 2 determines whether or not the size SZ of the touch panel 1 is at least a specific size SZA. The specific size SZA is for example a 17-inch size.

Upon the controller 2 determining that the size SZ of the touch panel 1 is smaller than the specific size SZA (No in Step S109), the process proceeds to Step S111 in FIG. 10. Upon the controller 2 determining that the size SZ of the touch panel 1 is at least the specific size SZA (Yes in Step S109), the process proceeds to Step S121.

In Step S121, the opening section 217 determines whether or not an operation to open the first file F1 using the second icon JC2 has been received from a user.

Upon the opening section 217 determining that an operation to open the first file F1 has not been received from a user (No in Step S121), the process enters the standby state. Upon the opening section 217 determining that an operation to open the first file F1 has been received from a user (Yes in Step S121), the process proceeds to Step S123.

In Step S123, the opening section 217 determines whether or not the first file F1 to be opened using the second icon JC2 is editable.

Upon the opening section 217 determining that the first file F1 is non-editable (No in Step S123), the process proceeds to Step S125.

In Step S125, the opening section 217 opens the first file F1 as read-only using the second icon JC2, displays a window on the touch panel 1, and displays the content of the first file F1 in the window, whereupon the process ends.

Upon the opening section 217 determining that the first file F1 is editable (Yes in Step S123), the process proceeds to Step S127.

In Step S127, the opening section 217 opens the first file F1 as editable using the second icon JC2 and displays a window on the touch panel 1, whereupon the process proceeds to Step S129 in FIG. 11.

If No in Step S109, the setting section 216 decides the maximum value NF of the number of files permitted to be opened depending on the size SZ of the touch panel 1 in Step S111 in FIG. 10.

Next, in Step S113, the setting section 216 decides an opening priority order PR for cases where a plurality of second icons JC2 are used to open the first file F1.

Next, in Step S115, the opening section 217 determines whether or not operations to open the first file F1 using two or more second icons JC2 have been received from users.

Upon the opening section 217 determining that operations to open the first file F1 using two or more second icons JC2 have not been received from users (No in Step S115), the process proceeds to Step S123 in FIG. 9. In such a situation, the opening section 217 receives an operation to open the first file F1 using one of the plurality of second icons JC2 from a user. Upon the opening section 217 determining that operations to open the first file F1 using two or more second icons JC2 have been received from users (Yes in Step S115), the process proceeds to Step S117.

In Step S117, the opening section 217 determines whether or not the number of the second icons JC2 for which the operations have been received from the users is no greater than the maximum value NF.

Upon the opening section 217 determining that the number of the second icons JC2 for which the operations have been received from the users is no greater than the maximum value NF (Yes in Step S117), the process proceeds to Step S123 in FIG. 9. Upon the opening section 217 determining that the number of the second icons JC2 for which the operations have been received from the users is greater than the maximum value NF (No in Step S117), the process proceeds to Step S119.

In Step S119, the opening section 217 decides whether or not to permit opening of the first file F1 for each of the two or more second icons JC2 in accordance with the opening priority order PR, whereupon the process proceeds to Step S123 in FIG. 9.

After completion of Step S127 in FIG. 9, the editing section 218 determines whether or not editing of the first file F1 is complete in Step S129 in FIG. 11.

Upon the editing section 218 determining that editing of the first file F1 is not complete (No in Step S129), the process ends. Upon the editing section 218 determining that editing of the first file F1 is complete (Yes in Step S129), the process proceeds to Step S131.

In Step S131, the editing section 218 gives the edited first file F1 the specific file name FN2 and stores the file given the specific file name FN2 in the storage 22.

Next, in Step S133, the opening section 217 determines whether or not an operation to open the first file F1 using the first icon JC1 has been received from a user.

Upon the opening section 217 determining that an operation to open the first file F1 has not been received from a user (No in Step S133), the process enters the standby state. Upon the opening section 217 determining that an operation to open the first file F1 has been received from a user (Yes in Step S133), the process proceeds to Step S135.

In S135, the opening section 217 opens the first file F1 and the second file F2.

Specifically, the opening section 217 opens the first file F1, displays a window on the touch panel 1, and displays the content of the first file F1 in the window. The opening section 217 also opens the second file F2, displays a window on the touch panel 1, and displays the content of the second file F2 in the window.

Next, in Step S137, the extracting section 219 extracts an edit out of the second file F2. The "edit" means a difference between the content of the second file F2 and the content of the first file F1.

Next, in Step S139, the reflecting section 220 reflects the edit in the content of the first file F1, whereupon the process ends.

Note that the process performed in Steps S133 to S139 is equivalent to an example of the "consolidation process" described with reference to FIG. 7.

According to the embodiment of the present disclosure, as described above with reference to FIGS. 3 to 11, the file given the specific file name FN2 (the second file F2) is opened in accordance with an operation to open the first file F1 using the first icon JC1. Thus, the file obtained by editing the first file F1 can be opened. This configuration allows the users to easily recognize any edit made to the first file F1. As a result, the device can provide further improved user-friendliness.

A difference (an edit) from the content of the first file F1 is extracted out of the file given the specific file name FN2, and the difference is reflected in the content of the first file F1. Editing can therefore be performed efficiently by a plurality of persons. Thus, the device can provide further improved user-friendliness.

Figure 12:
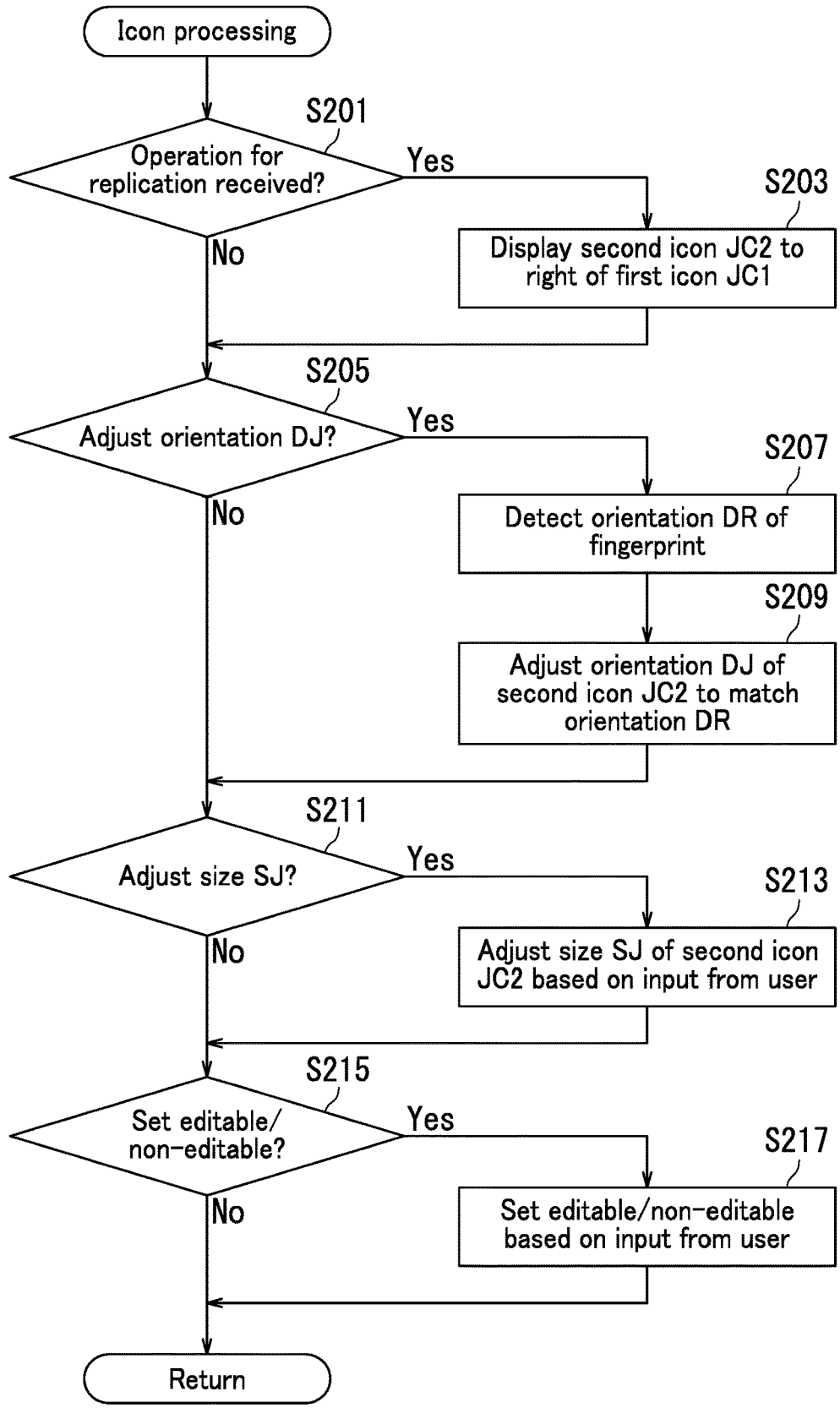
FIG. 12 is a flowchart illustrating icon processing that is performed by the controller.

The following further describes the process that is performed by the controller 2 with reference to FIGS. 3 to 12. FIG. 12 is a flowchart illustrating the "icon processing" that is performed by the controller 2.

First, in Step S201 in FIG. 12, the second display section 213 determines whether or not an operation to replicate the first icon JC1 to generate the second icon JC2 has been received from a user. Specifically, the second display section 213 determines whether or not the replication button BT1 in the menu screen 310 illustrated in FIG. 4 has been touched.

Upon the second display section 213 determining that an operation to generate the second icon JC2 has not been received (No in Step S201), the process proceeds to Step S205. Upon the second display section 213 determining that an operation to generate the second icon JC2 has been received (Yes in Step S201), the process proceeds to Step S203.

In Step S203, the second display section 213 displays the second icon JC2 associated with the first file F1 on the touch panel 1.

Next, in Step S205, the adjustment section 215 determines whether or not to adjust the orientation DJ of the second icon JC2. Specifically, the adjustment section 215 determines whether or not the orientation adjustment button BT2 in the menu screen 310 illustrated in FIG. 4 has been touched.

Upon the adjustment section 215 determining not to adjust the orientation DJ of the second icon JC2 (No in Step S205), the process proceeds to Step S211. Upon the adjustment section 215 determining to adjust the orientation DJ of the second icon JC2 (Yes in Step S205), the process proceeds to Step S207.

In Step S207, the detection section 214 detects the orientation DR of the fingerprint of the user.

Next, in Step S209, the adjustment section 215 adjusts the orientation DJ of the second icon JC2 so that the orientation DJ of the second icon JC2 matches the orientation DR of the fingerprint based on the result of the detection by the detection section 214. The adjustment section 215 also decides the position of the second icon JC2 to be displayed depending on the orientation DJ of the second icon JC2.

In Step S211, the adjustment section 215 determines whether or not to adjust the size SJ of the second icon JC2. Specifically, the adjustment section 215 determines whether or not the size adjustment button BT3 in the menu screen 310 illustrated in FIG. 4 has been touched.

Upon the adjustment section 215 determining not to adjust the size SJ of the second icon JC2 (No in Step S211), the process proceeds to Step S215. Upon the adjustment section 215 determining to adjust the size SJ of the second icon JC2 (Yes in Step S211), the process proceeds to Step S213.

In Step S213, the adjustment section 215 adjusts the size SJ of the second icon JC2 in accordance with the operation by the user.

Next, in Step S215, the setting section 216 determines whether or not to set the editable/non-editable state of the first file F1 for the case where the first file F1 is opened using the second icon JC2. Specifically, the setting section 216 determines whether or not the editing state setting button BT4 in the menu screen 310 illustrated in FIG. 4 has been touched.

Upon the setting section 216 determining not to set the editable/non-editable state of the first file F1 for the case where the first file F1 is opened using the second icon JC2 (No in Step S215), the process returns to Step S109 in FIG. 9. Upon the setting section 216 determining to set the editable/non-editable state of the first file F1 for the case where the first file F1 is opened using the second icon JC2 (Yes in Step S215), the process proceeds to Step S217.

In Step S217, the setting section 216 sets the editable/non-editable state of the first file F1, that is, whether the first file F1 is to be editable or non-editable when the first file F1 is opened using the second icon JC2 in accordance with the operation by the user, whereupon the process returns to Step S109 in FIG. 9.

As described above with reference to FIGS. 3 to 12, the orientation DJ and the size SJ of the second icon JC2 are adjusted in accordance with operations by the user on the menu screen 310 illustrated in FIG. 4. Also, the position of the second icon JC2 to be displayed and whether the first file F1 is to be editable or non-editable when the first file F1 is opened using the second icon JC2 are decided in accordance with operations by the user on the menu screen 310 illustrated in FIG. 4. Through the above, the user can readily adjust the orientation DJ and the size SJ of the second icon JC2, and can readily decide the position of the second icon JC2 to be displayed and whether the first file F1 is to be editable or non-editable when the first file F1 is opened using the second icon JC2. Thus, the device can provide further improved user-friendliness.

Figure 13:
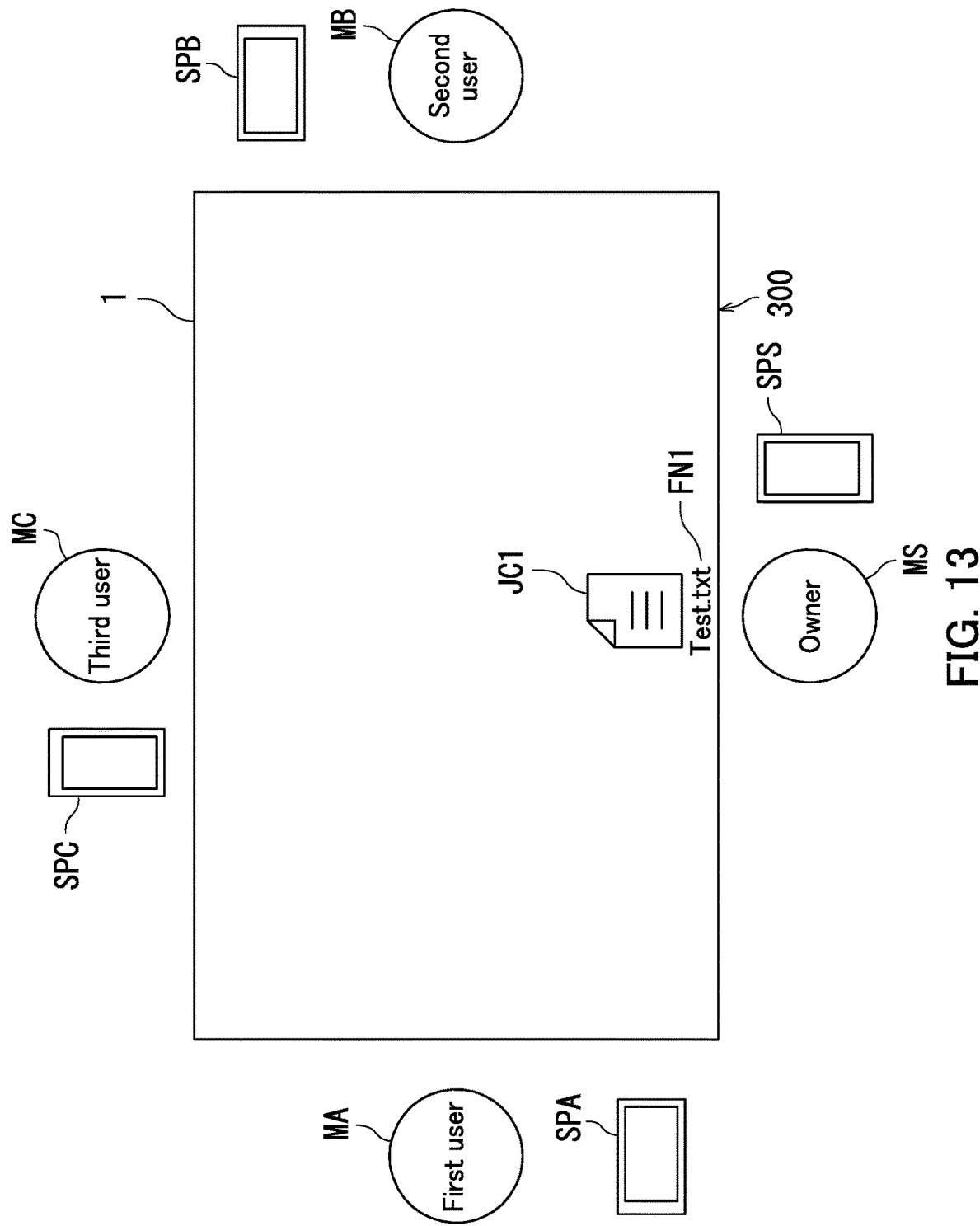
FIG. 13 is a diagram illustrating an example of a process that is performed by an associating section.

The following further describes the process that is performed by the controller 2 with reference to FIGS. 7 to 13. FIG. 13 is a diagram illustrating an example of a process that is performed by the associating section 221 illustrated in FIG. 7. As illustrated in FIG. 13, a smartphone SPS is disposed in the vicinity of the owner MS. A smartphone SPA is disposed in the vicinity of the first user MA. A smartphone SPB is disposed in the vicinity of the second user MB. A smartphone SPC is disposed in the vicinity of the third user MC. In the following description, each of the smartphones SPS, SPA, SPB, and SPC may be generically referred to as a smartphone SP.

Each of the smartphones SPS, SPA, SPB, and SPC is communicatively connected to the controller 2. Specifically, each of the smartphones SPS, SPA, SPB, and SPC is communicatively connected to the controller 2 for example through short-range wireless communication (more specifically, BLUETOOTH (registered Japanese trademark)) based on standards described in IEEE 802.15. The smartphones SPS, SPA, SPB, and SPC are equivalent to an example of what may be referred to as "a plurality of input devices".

The associating section 221 associates the smartphones SPA, SPB, and SPC with the orientations DJ of the second icons JC2. Specifically, the associating section 221 associates the smartphone SPA with the second icon JC2A whose orientation DJ is 90 degrees. More specifically, the associating section 221 enables operation of an icon and a window in the same orientation DJ as the second icon JC2A through the smartphone SPA.

Likewise, the associating section 221 associates the smartphone SPB with the second icon JC2B whose orientation DJ is 270 degrees. More specifically, the associating section 221 enables operation of an icon and a window in the same orientation DJ as the second icon JC2B through the smartphone SPB. Likewise, the associating section 221 associates the smartphone SPC with the second icon JC2C whose orientation DJ is 180 degrees. More specifically, the associating section 221 enables operation of an icon and a window in the same orientation DJ as the second icon JC2C through the smartphone SPC.

Furthermore, the associating section 221 associates the smartphone SPS with the first icon JC1. More specifically, the associating section 221 enables operation of an icon and a window in the same orientation DJ as the first icon JC1 through the smartphone SPS.

As described above with reference to FIGS. 7 to 13, the three smartphones SP (the smartphones SPA, SPB, and SPC) are associated with the orientations DJ of the respective second icons JC2. Thus, the three users (the first, second, and third users MA, MB, and MC) can perform different operations on the single touch panel 1 by operating the smartphones SP associated with the orientations DJ of the respective second icons JC2. Editing can therefore be performed efficiently by the three people. As a result, the device can provide further improved user-friendliness.

Furthermore, the owner MS can perform an operation on the touch panel 1 by operating the smartphone SPS. That is, editing can be performed more efficiently. Thus, the device can provide further improved user-friendliness.

According to the embodiment of the present disclosure, the input devices are the smartphones SP. However, the present disclosure is not limited as such, so long as the input devices receive operations from the users. The input devices may be keyboards or mice.

The embodiment of the present disclosure has been described using a configuration in which the tablet terminal 100 has one display 11. However, the present disclosure is not limited as such. The tablet terminal 100 may have a plurality of (for example, two) displays. That is, the controller 2 may control multiple displays (or multiple screens). In a configuration in which the four users use two displays, for example, the owner MS and the first user MA may use one of the displays, and the second user MB and the third user MC may use the other display. A configuration in which the controller 2 controls multiple screens allows a single small-size (for example, 14-inch) display to be used by a plurality of users.

In a configuration in which the display 11 of the tablet terminal 100 includes a plurality of displays, the associating section 221 associates the displays with the orientations DJ of the second icons JC2. The following describes an example in which the display 11 includes two displays.

Specifically, the associating section 221 associates one of the two displays with the first icon JCL More specifically, an icon and a window in the same orientation DJ as the first icon JC1 are displayed on the one display.

The associating section 221 also associates the other display of the two displays with the second icon JC2A whose orientation DJ is 90 degrees. More specifically, an icon and a window in the same orientation DJ as the second icon JC2A are displayed on the other display.

The associating section 221 also associates the other display of the two displays with the second icon JC2B whose orientation DJ is 270 degrees. More specifically, an icon and a window in the same orientation DJ as the second icon JC2B are displayed on the other display.

The associating section 221 also associates the other display of the two displays with the second icon JC2C whose orientation DJ is 180 degrees. More specifically, an icon and a window in the same orientation DJ as the second icon JC2C are displayed on the other display.

Through the above, an embodiment of the present disclosure has been described with reference to the drawings. However, the present disclosure is not limited to the above embodiment and may be implemented in various different forms that do not deviate from the essence of the present disclosure (for example, as described below in sections (1) and (2)). The drawings schematically illustrate elements of configuration in order to facilitate understanding and properties of elements of configuration illustrated in the drawings, such as thickness, length, and number thereof, may differ from actual properties thereof in order to facilitate preparation of the drawings. Furthermore, properties of elements of configuration described in the above embodiment, such as shapes and dimensions, are merely examples and are not intended as specific limitations. Various alterations may be made so long as there is no substantial deviation from the configuration of the present disclosure.

(1) According to the above embodiment of the present disclosure, the "display control device" is the tablet terminal 100 as described with reference to FIG. 1. However, the present disclosure is not limited as such, so long as the "display control device" includes the display 11 and the controller 2. For example, the "display control device" may be a personal computer.

(2) According to the above embodiment of the present disclosure, four users operate the touch panel 1 as described with reference to FIGS. 1 and 2. However, the present disclosure is not limited as such, so long as a plurality of users operate the touch panel 1. For example, two users may operate the touch panel 1, or three users may operate the touch panel 1. For another example, five or more users may operate the touch panel 1.

What is claimed is:

1. A display control device comprising:
   a display;
   a first display section configured to display a first icon associated with a first file on the display;
   a determination section configured to determine whether or not a specific operation has been performed with respect to the first icon;
   a second display section configured to display a second icon associated with the first file on the display upon the determination section determining that the specific operation has been performed with respect to the first icon;
   an adjustment section configured to adjust an orientation and a size of the second icon;
   a setting section configured to decide whether the first file is to be editable or non-editable when the first file is opened using the second icon;
   an editing section configured to, when the first file is edited based on a result of decision by the setting section, give the edited first file a specific file name and store the file given the specific file name;
   an opening section; and
   an extracting section,
   wherein
   the orientation of the second icon is different from an orientation of the first icon,
   the specific file name given to the edited file is different from the file name given to the first file, and
   when a plurality of the edited files are stored,
      the opening section opens the first file and the plurality of the edited files in accordance with an operation to open the first file using the first icon, and
      the extracting section extracts, out of each of the edited files, a difference between content of the edited file and content of the first file.

2. The display control device according to claim 1, wherein
   the adjustment section decides a position of the second icon to be displayed on the display depending on the orientation of the second icon.

3. The display control device according to claim 1, further comprising
   a detection section configured to detect an orientation of a user, wherein
   the adjustment section adjusts the orientation of the second icon based on a result of the detection by the detection section.

4. The display control device according to claim 1, further comprising
   a detection section configured to detect at least one of an orientation of a fingerprint of a user or a gaze direction of the user, wherein
   the adjustment section adjusts the orientation of the second icon based on a result of the detection by the detection section.

5. The display control device according to claim 1, wherein
   the setting section decides an opening limitation for a case where the first file is opened using the second icon, wherein the opening limitation indicates a maximum value of the number of files permitted to be opened depending on a size of the display.

6. The display control device according to claim 1, further comprising
a reflecting section configured to reflect the difference in the content of the first file, wherein
the content of the first file after reflection of the difference is stored as the first file still with the file name given to the first file.

7. The display control device according to claim 1, wherein
the display is communicatively connected to a plurality of input devices, and
the display control device further comprises an associating section configured to associate the input devices with orientations of a plurality of the second icons.

8. The display control device according to claim 1, wherein
the display includes a plurality of displays, and
the display control device further comprises an associating section configured to associate the displays with orientations of a plurality of the second icons.

9. The display control device according to claim 1, wherein
the second icon includes an image indicating a user who uses the second icon.

\* \* \* \* \*